(12) United States Patent
Sheriff

(10) Patent No.: US 9,374,986 B2
(45) Date of Patent: Jun. 28, 2016

(54) SHRIMP CULTURING SYSTEM

(71) Applicant: Richard L. Sheriff, Big Pine Key, FL (US)

(72) Inventor: Richard L. Sheriff, Big Pine Key, FL (US)

( * ) Notice: Subject to any disclaimer, the term of this patent is extended or adjusted under 35 U.S.C. 154(b) by 245 days.

(21) Appl. No.: 14/290,885

(22) Filed: May 29, 2014

(65) Prior Publication Data

US 2015/0342156 A1     Dec. 3, 2015

(51) Int. Cl.
    *A01K 61/00*           (2006.01)
    *A01K 63/04*           (2006.01)

(52) U.S. Cl.
    CPC ............. *A01K 61/005* (2013.01); *A01K 63/042* (2013.01)

(58) Field of Classification Search
    CPC ... A01K 61/005; A01K 63/04; A01K 63/042; A01K 61/00; A01K 97/05
    See application file for complete search history.

(56) References Cited

U.S. PATENT DOCUMENTS

| | | | | |
|---|---|---|---|---|
| 3,473,509 | A * | 10/1969 | Miyamura | A01K 61/00 119/205 |
| 3,477,406 | A * | 11/1969 | Fujinaga | A01K 61/00 119/205 |
| 3,773,014 | A | 11/1973 | Ewald, Jr. | |
| 3,797,458 | A * | 3/1974 | Day | A01K 61/005 119/209 |
| 3,900,004 | A * | 8/1975 | Goldman | A01K 61/00 119/252 |
| 3,913,525 | A | 10/1975 | Plocek | |
| 4,279,218 | A * | 7/1981 | Brinkworth | A01K 61/002 119/200 |
| 4,382,423 | A * | 5/1983 | Dugan | A01K 73/12 119/211 |
| 4,495,891 | A * | 1/1985 | Dugan | A01K 61/00 119/211 |
| 4,501,227 | A | 2/1985 | Dugan et al. | |
| 4,607,595 | A | 8/1986 | Busot et al. | |
| 5,038,715 | A | 8/1991 | Fahs, II | |
| 5,484,525 | A * | 1/1996 | Mowka, Jr. | A01K 63/04 119/263 |
| 6,065,430 | A | 5/2000 | Sheriff | |
| 6,584,935 | B2 * | 7/2003 | Zohar | A01K 61/00 119/204 |
| 7,174,850 | B2 | 2/2007 | Hsiao | |
| 7,222,585 | B2 * | 5/2007 | Jablonsky | A01K 61/00 119/211 |
| 7,682,504 | B2 | 3/2010 | Bradley et al. | |

(Continued)

FOREIGN PATENT DOCUMENTS

| | | | | |
|---|---|---|---|---|
| JP | 2003-235391 | | 8/2003 | |
| KR | WO 2013081255 | A1 * | 6/2013 | ............. A01K 29/00 |
| WO | WO 2009/090521 | A2 | 7/2009 | |

OTHER PUBLICATIONS

Machine translation of WO 2013081255 to Song et al., dated Jun. 2013.*

(Continued)

*Primary Examiner* — Kathleen Alker
(74) *Attorney, Agent, or Firm* — Richard C. Litman

(57) ABSTRACT

The shrimp culturing system includes a culturing tank and a clarifier tank. A plurality of shrimp cubes are suspended in the culture tank by set pairs of support bars. Each shrimp cube includes a plurality of stacked frames set at predetermined intervals. Each frame supports a mesh therein providing living space for the shrimp, and each stack is interconnected by ropes, which connect to the support bars to be suspended thereby. The shrimp cubes provide maximal space for culturing shrimp. The waste water from the culture tank cycles into the clarifier tank, which nurtures a biofloc to consume the waste and assimilate nitrogen, thereby producing their own waste that can be consumed by the shrimp. Excess solid waste drains via a solids removal manifold, and clarified water is airlifted back into the culture tank. A post-larval tank can be stacked onto the clarifier tank to introduce new batches of shrimp.

15 Claims, 5 Drawing Sheets

(56) References Cited

U.S. PATENT DOCUMENTS

| | | | |
|---|---|---|---|
| 8,117,992 B2* | 2/2012 | Parsons | A01K 63/00 119/200 |
| 8,485,132 B2* | 7/2013 | Kong | A01K 63/02 119/223 |
| 2001/0045189 A1 | 11/2001 | McNeil | |
| 2008/0107768 A1 | 5/2008 | Hinojosa et al. | |
| 2011/0204003 A1* | 8/2011 | Kaczor | A01K 61/003 210/800 |

OTHER PUBLICATIONS

"The Breeder's Net: Culture of Mysid Shrimp and Bivalve Trochphores (veligers)," Marini et al., Advanced Aquarist website, www.advancedaquarist.com/2003/9/breeder, 15 pages, retrieved Apr. 11, 2014.

U.S. Appl. No. 14/289,623, Richard L. Sheriff, filed electronically on May 28, 2014.

* cited by examiner

SHRIMP CULTURING SYSTEM

BACKGROUND OF THE INVENTION

1. Field of the Invention

The present invention relates to aquaculture devices, and particularly to a shrimp culturing system utilizing air to aerate and circulate water and power the system, as well as maximize shrimp production capacity.

2. Description of the Related Art

Many people enjoy consuming shrimp. It is one of the most common and popular species of seafood that appeals to the general public. As demand grows, at times, the demand cannot be easily met by conventional harvesting methods, and consequently, the consumer must bear with correspondingly increased costs.

Most conventional methods of obtaining shrimp involve harvesting the shrimp from their natural habitat, either in the seas or bodies of fresh water, for example. Though relatively abundant, the amount of shrimp that can be harvested can be affected by various factors, such as the resiliency of certain species to fishery pressures, life cycles, and seasonal availability. This can impact the general availability of shrimp for the consumers.

Other attempts to meet consumer demands involve various shrimp farms. These shrimp farms usually include artificial cages or fences placed in a natural body of water where the shrimp reside, or artificial and/or lined ponds which demarcate areas for controlled cultivation of the shrimp, for example. The shrimp are supplied with special feed that both attract and promote growth. When using the natural environment of the shrimp, such as the sea, river or pond where the shrimp normally thrive, oxygenation and waste management is not as much of a concern to the farmer because the natural environment usually provides sufficient oxygen through the normal movement of the water and interaction with other organisms, e.g., bacteria and plant life, that occupy the same space. When using artificial bodies of water, oxygenation and waste management becomes much more of a concern because proper management of both must be maintained to insure survivability of the shrimp.

However, such conventional methods can also make them highly susceptible to outside factors. For example, some bodies of water may not be exempt from disposal of industrial or commercial wastes which can contaminate the water, thereby introducing foreign substances potentially lethal to the shrimp being cultivated. Any surviving shrimp in such a contaminated environment may not be safe for consumption. The open nature of these farms can also drastically reduce protection from potential natural dangers. These natural dangers can encompass severe weather conditions and viruses, for example. Natural disasters can permanently damage equipment, and viruses have been known to devastate whole populations of the shrimp being cultivated. Either situation is detrimental to the farmer in the form of lost revenue and lost product.

In light of the above, it would be desirable to have a shrimp culture system that provides a sheltering protective environment for shrimp to thrive at a relative maximal capacity while aerating and nitrifying the water, efficiently and economically. Thus, a shrimp culturing system addressing the aforementioned problems is desired.

SUMMARY OF THE INVENTION

The shrimp culturing system includes a culturing tank and an integral clarifier tank extending therefrom. A plurality of shrimp cubes are suspended in the culture tank by set pairs of support bars. Each shrimp cube includes a plurality of stacked frames set at predetermined intervals. Each frame supports a mesh therein providing living space for the shrimp, and each stack is interconnected, such as by ropes, which connect to the support bars to be suspended thereby. The shrimp cubes provide maximal space for culturing shrimp. The waste water from the culture tank cycles into the clarifier tank, which nurtures a biofloc to consume the waste and assimilate nitrogen, thereby producing their own waste that can be consumed by the shrimp. Excess solid waste drains via a solids removal manifold, and clarified water is airlifted back into the culture tank. A post-larval tank can be stacked onto the clarifier tank to introduce new batches of shrimp.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
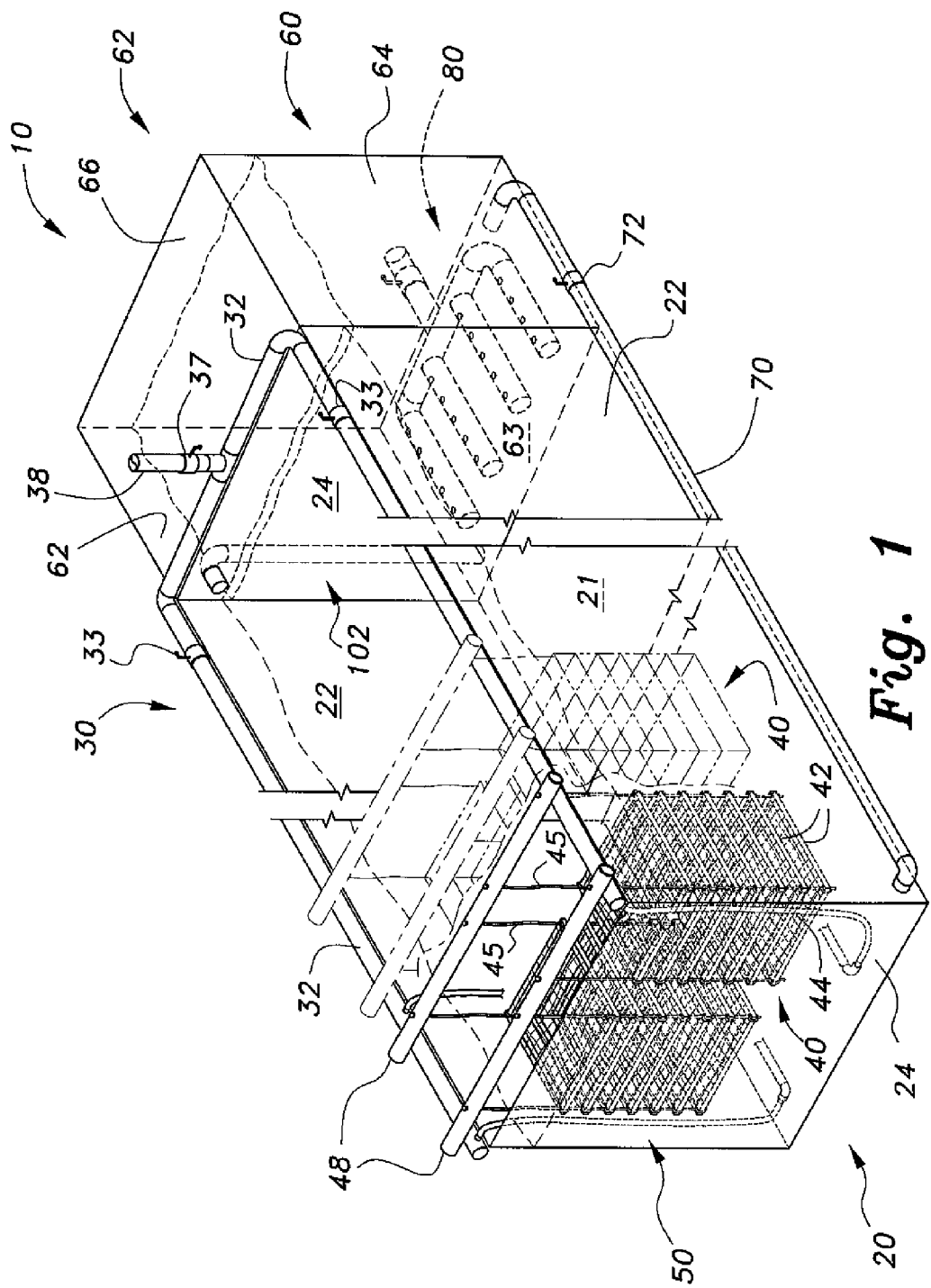
FIG. 1 is an environmental, perspective view of a shrimp culturing system according to the present invention.

The shrimp culturing system, generally referred to by the reference number 10 in the drawings, provides a protective environment and an artificial habitat with maximal surface area for shrimp to grow and thrive. The shrimp culturing system 10 utilizes air to aerate the system and transfer the water from one location to another. The shrimp culturing system 10 includes a culture tank 20, a clarifier tank 62 extending from or associated with the culture tank 20, an auxiliary post-larval (PL) tank 110 stackable on top of the clarifier tank 62, and an air manifold 30 facilitating aeration and movement of the water throughout the shrimp culturing system 10.

Figure 2:
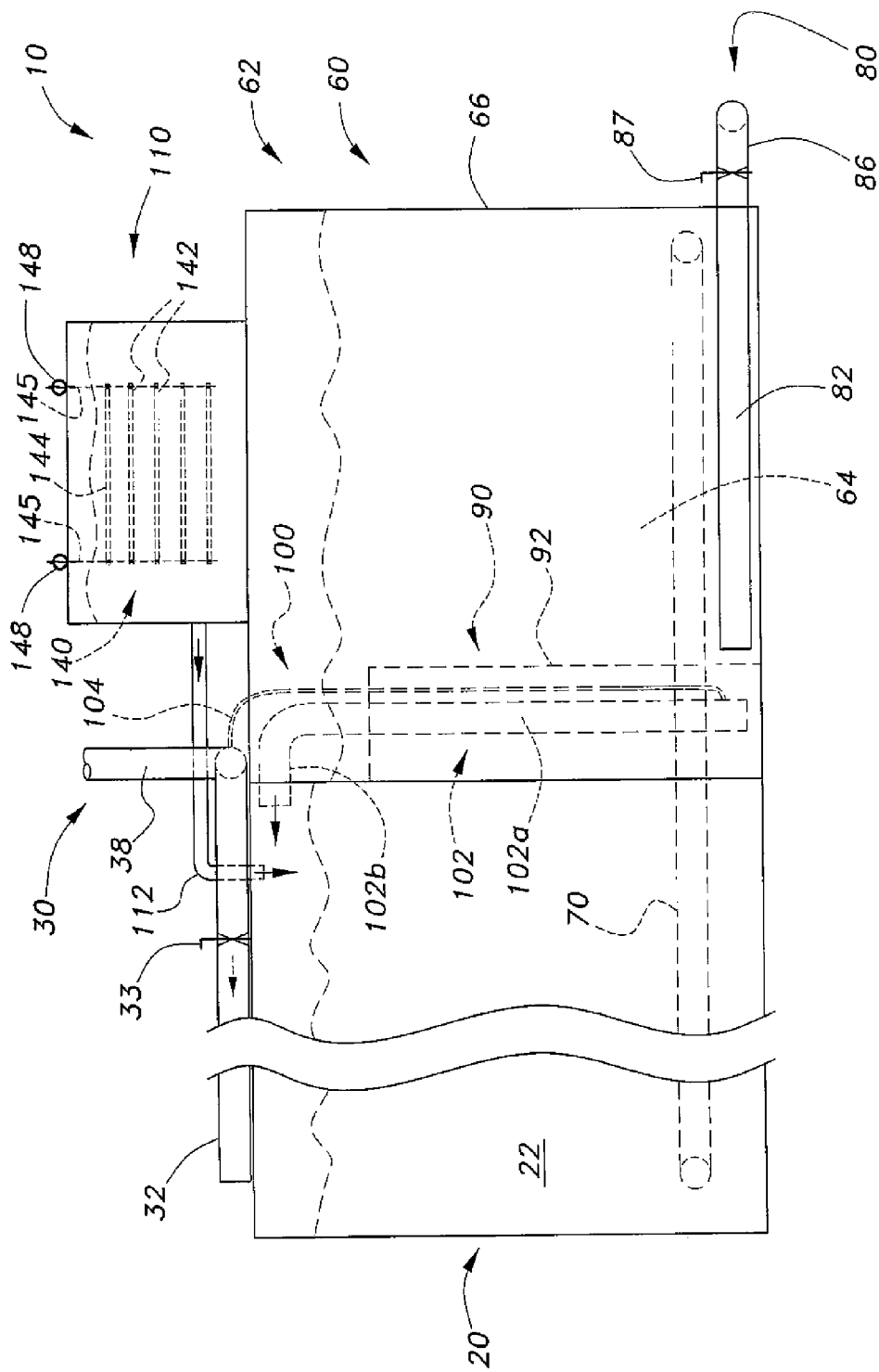
FIG. 2 is a diagrammatic side view of the shrimp culturing system shown in FIG. 1 with air diffuser assemblies removed for clarity.
Figure 3:
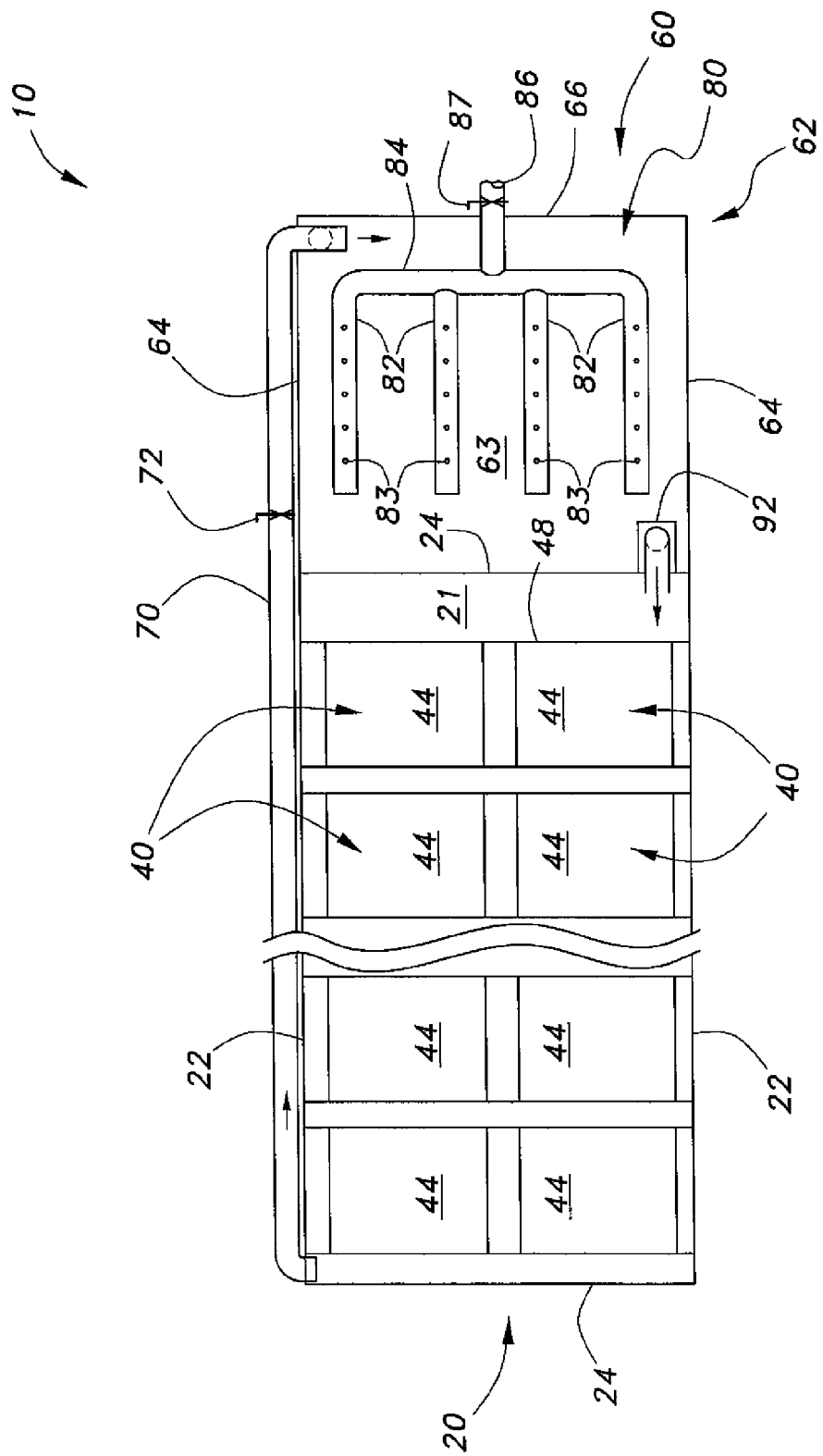
FIG. 3 is a diagrammatic top view of the shrimp culturing system shown in FIG. 1.
Figure 4:
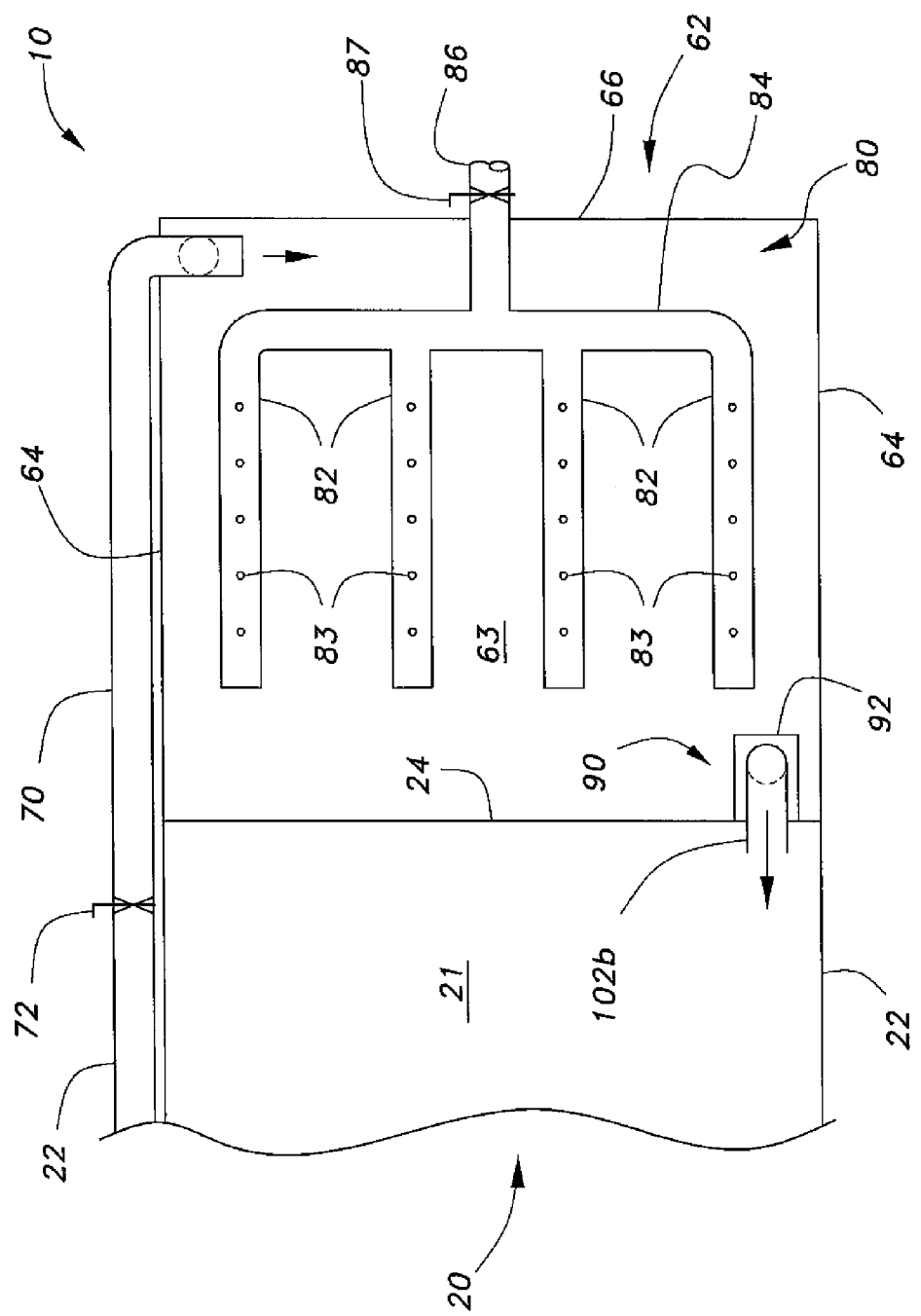
FIG. 4 is a diagrammatic detailed top view of the shrimp culturing system shown in FIG. 1 detailing the components for removing solids in the clarifier tank.

As best seen in FIGS. 1-3, the culture tank 20 is desirably constructed as an elongate open container configured to house and raise shrimp. The culture tank 20 includes at least a pair of opposed elongated sides or sidewalls 22 and at least a pair of opposed short sides or sidewalls 24 connected to the opposite ends of the elongated sidewalls 22. The four sidewalls are attached to a flat bottom 21, creating a reservoir for holding water and shrimp with an open top. This reservoir is shown fragmented in FIG. 1 to indicate various sizes and volumes, as can depend on the particular use or application, and should not be construed in a limiting sense.

The air manifold 30 is mounted above the culture tank 20 and the clarifier tank 62. The air manifold 30 is in fluid connection with a source of compressed air, such as a conventional air compressor or compressed air tank, for example.

An inlet, such as provided by an inlet pipe 38, is coupled to the air source, and a control valve 37 is selectively operable to control the rate of air flow through the air manifold 30. The air manifold 30 includes a plurality of pipes 32 mounted or suspended along the top periphery of at least the culture tank 20. The layout of the air pipes 32 desirably match the outline of at least the culture tank 20 so as to be positioned for relatively easy use without being a substantial hindrance to the user during maintenance and general upkeep of the shrimp culturing system 10. A control valve 33 can be disposed at select locations on the air pipes 32 to regulate the air flowing through the air manifold 30.

The shrimp being cultivated in the culture tank 20 are not left to roam free per se. The shrimp culturing system 10 is provided with an artificial habitat for them to flourish in optimum conditions. The shrimp culturing system 10 includes a plurality of shrimp tubes or cubes 40 suspended inside the tank, with each shrimp cube 40 constructed so as to provide maximal surface area for the shrimp to reside. The shrimp cube 40 can also be referred to as a shrimp housing or shrimp habitat cell. Also, use of the word "cube" in relation to the shrimp cubes 40 is not to be construed as being limited to a geometric cube shaped structure or structures or cells, but can encompass structures or cells of various suitable shapes, sizes, dimensions and arrangements, for example, as can depend on the particular use or application, and should not be construed in a limiting sense.

Each shrimp cube 40 includes a plurality of square or rectangular frames 42 with each frame 42 having a mesh 44 stretched inside the frame 42. The frame 42 is desirably constructed from aluminum, or other suitable material, which is sturdy and resistant to corrosion, especially in saltwater, for example. Each frame 42 and mesh 44 form a habitable bed or layer for the shrimp to reside within a given surface area. The plurality of such layers in the shrimp cube 40 increases the habitable surface area, as well as a corresponding habitable volume, for the shrimp in the shrimp culturing system 10, thus assisting in maximizing the same.

Each layer is coupled to each other in a stacked manner such that a predetermined gap exists between the layers in a corresponding shrimp cube 40. A connecting member 45, such as a rope, string, or cable, threads through an opening 46 on each corner of the frame 42 to form deformable corner posts for the stack of layers included in a corresponding shrimp cube 40. For a given length of rope as the connecting member 45, a knot above and below the hole 46 at each corner of the frame 42 or a knot or a coiled arrangement around each corner of the frame 42 assists in preventing adjacent frames 42 from sliding onto another along the length of the rope 45. Also, plugs can be fixedly mounted above and below each opening 46 on each corner of the frame 42 along each rope, string or cable 45. As the shrimp cube 40 is suspended in the water in the culture tank 20, the gap between the layers assists in providing a relatively sufficient water circulation to occur between the layers in the shrimp cube 40 to provide oxygen and food for the shrimp residing thereon. The use of ropes, strings or cables 45, or other suitable types of connecting members, also allows the stack of frames 42 to collapse on top of each other when out of the water during harvest of the shrimp, as well as to compact each shrimp cube 40 for storage, for example.

In use, at least one and desirably a plurality of the shrimp cubes 40 are coupled to a pair of support bars 48 by the ropes, strings or cables 45 to be suspended therefrom. The support bars 48 lie across the width of the culture tank 20 so that the opposite ends thereof rest on the top of the air pipes 32 running along the top edge of opposing sidewalls 22 to provide support for and from which each shrimp cube 40 can hang immersed in the water in the culture tank 20. As best seen in FIGS. 1 and 3, multiple sets or combinations of support bars 48 and shrimp cubes 40 can be arranged into plural columns along the length of the culture tank 20. It can be seen that this arrangement can facilitate relatively easy preparation of the culture tank 20 to receive new batches of shrimp with a relatively large surface area ready for occupancy, and the plurality of shrimp cubes 40 can be relatively easily removed from the culture tank 40 at time of harvest or for periodic maintenance of the shrimp culturing system 10, for example.

It is contemplated that the ropes, strings or cables 45 that connect the multiple frames 42 can be replaced with stiffer or non-flexible components as connecting members, such as rods or tubes for example. This correspondingly produces a relatively rigid, non-collapsible shrimp cube 40, which will generally be of a more rugged construction. However, the non-collapsible shrimp cube 40 can require more space for storage, and the installation and removal in and out of the culture tank 20 can be relatively more difficult.

Figure 5:
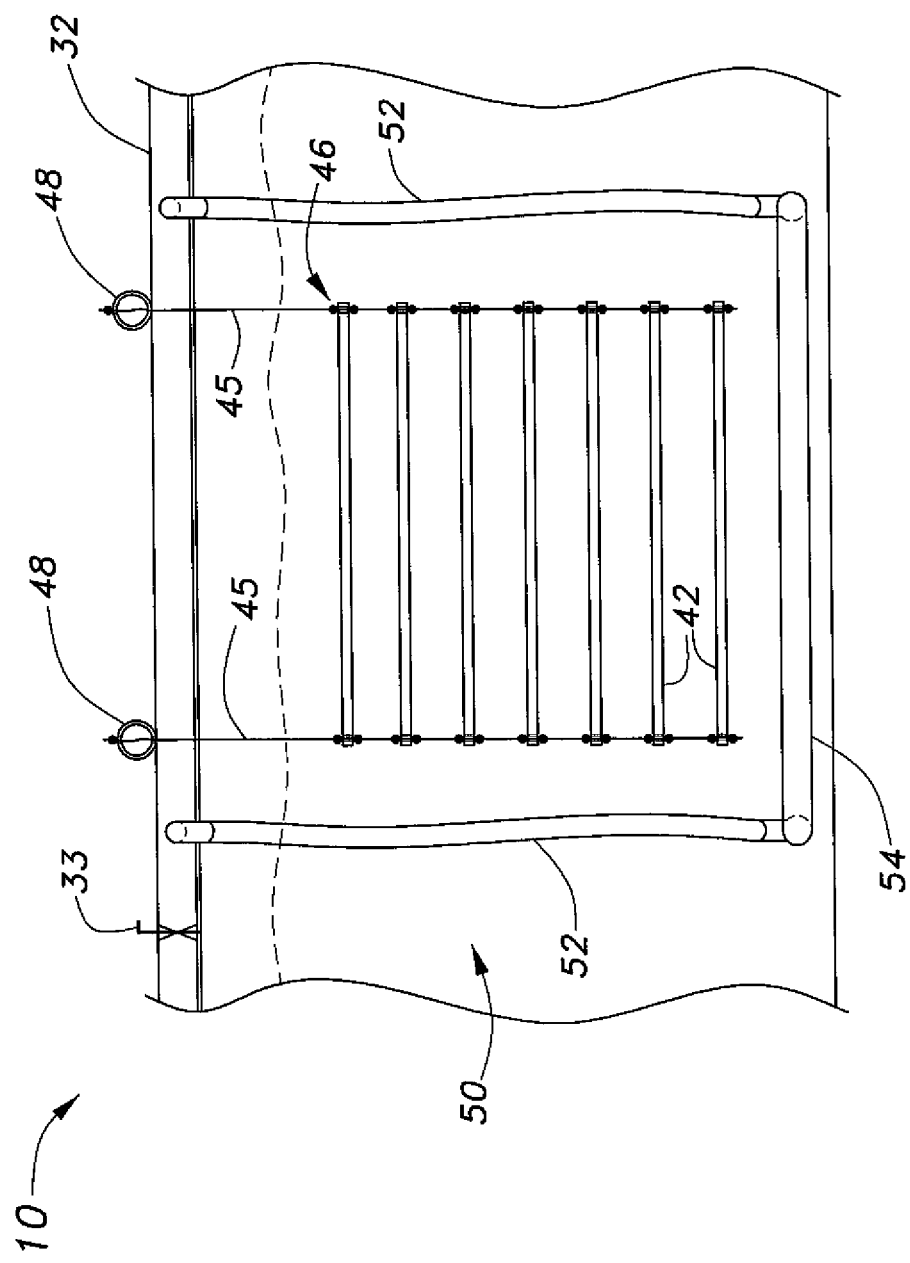
FIG. 5 is a diagrammatic detailed side view of the shrimp culturing system shown in FIG. 1 detailing the aerating assembly for each set of shrimp cubes.

Besides the living space provided by each shrimp cube 40, the shrimp must also be supplied with sufficient oxygen. To facilitate the supplying of oxygen, the shrimp culturing system 10 includes a plurality of air diffuser assemblies 50 coupled to the air manifold 30. As best seen in FIGS. 1 and 5, each air diffuser assembly 50 includes at least one air tube 52, desirably a pair of air tubes 52, coupled at one end to one of the air pipes 32 extending along the length of the culture tank 20. The air tubes 52 extend into the interior of the culture tank 20, and the opposite end of the air tube 52 is coupled to an elongate diffuser 54. In an embodiment, a pair of the air tubes 52 is desirably coupled to opposite ends of a diffuser 54, for example. Each diffuser 54 is desirably placed at the bottom of the culture tank 20 so that each diffuser 54 will lie beneath each corresponding shrimp cube 40 when the shrimp cubes 40 are suspended inside the culture tank 20. This arrangement assists in providing the air bubbles from the diffuser 54 so as to propagate through the layers of frames 42 to aerate the water contained in the culture tank 20 and provide relatively sufficient oxygen for the shrimp residing in the shrimp cubes 40. Moreover, the diffusers 54 assist in agitating the water and inducing opposing current flows in the water, which assists in maintaining a relatively constant water agitation and movement generally required for a healthy environment for the shrimp to thrive, as well as enabling solids to remain substantially suspended in the water in the culture tank 20.

As the shrimp grow inside the culture tank 20, they also produce wastes that must be disposed of in some manner. Some of the concerns that the farmer, grower or user must consider relate to managing the concentrations or levels of harmful chemicals, such as ammonia in the water. The shrimp culturing system 10 utilizes a symbiotic relationship between bacteria and the shrimp being grown to facilitate processing of waste material, as can reduce a need for a separate filter in this regard, for example.

As best seen in FIGS. 1-4, the shrimp culturing system 10 includes a clarifier assembly 60 directly integrated with or in association with the culture tank 20. The clarifier assembly 60 removes or substantially removes the potentially or relatively harmful concentrations of harmful chemicals, such as ammonia, to form clarified water, which is recirculated back into the culture tank 20. The clarifier assembly 60 includes the clarifier tank 62 extending from or in association with the culture tank 20. The clarifier tank 62 can be constructed similar to the culture tank 20 in that the clarifier tank 62 is constructed as an open container or reservoir, for example. At least a pair of opposing first sides or sidewalls 64, at least one second sides or sidewalls 66 connected to opposite ends of the first sidewalls 64, and a bottom 63 form the clarifier tank 62. The culture tank 20 and the clarifier tank 62 together can desirably form a substantially elongate over-tank with two compartments where each compartment is defined by the culture tank 20 and the clarifier tank 62. Such arrangement can assist in maximizing the footprint of the shrimp culturing system 10 so that substantially no space is wasted by separate tanks disposed at locations remote from the other. Maximal use of a given amount of space is typically considered a priority for farmers, growers or users to maximize the harvest capacity of the shrimp. The clarifier tank 62 can be constructed as an extension of the culture tank 20, as shown in the drawings of FIGS. 1-4, where one of the short sidewalls 24 forms a partition or a common wall between the culture tank 20 and the clarifier tank 62. Also, the clarifier tank 62 can be constructed as a separate structure, but with two second sidewalls 66, with one of the second sidewalls 66 secured to the culture tank 20 such as with fasteners, welds, and the like, or the clarifier tank 62 can be otherwise associated with the culture tank 20 as separate structures, as can depend on the use or application, and should not be construed in a limiting sense.

The clarifier tank 62 is supplied with water from the culture tank 20 which contains solid and other waste material. An exterior water return line 70 extends from the bottom of the culture tank 20 towards the bottom of the clarifier tank 62 to supply the same with water and waste material from the culture tank 20. A control valve 72 can be operatively coupled to the water return line 70 to permit selective flow of the waste water to the clarifier tank 62. The clarifier tank 62 nurtures biofloc that consumes the waste material and assimilates the nitrogen from the waste water, thus reducing ammonia concentrations, and producing waste products of their own in the form of protein that can be consumed by the shrimp. Thus, a mutually beneficial symbiotic relationship exists between the biofloc and the shrimp in the shrimp culturing system 10. The biofloc is generally an aggregate of bacteria, algae, and plankton that thrive in this type of environment.

To insure a healthy symbiotic relationship, the composition of the water inside the clarifier tank 62, more specifically, the carbon to nitrogen ratio, must be carefully maintained. In an embodiment, a method for monitoring this ratio involves obtaining a sample of a given quantity of the water in the clarifier tank 62 and measuring the amount of solids that settle in a measuring container. In this instance, a graduated cylinder can be used as the measuring container to facilitate the measurements. Generally, the solids settle relatively fast, so a relatively short amount of time is generally required to perform this task. The solids contain the assimilated nitrogen as a result of breaking down the ammonia in the water. The volume of solids compared to the remaining volume in the sample provides an indicator of the carbon to nitrogen ratio in the water.

While the above described use of biofloc in the clarifier tank 62 reduces potentially harmful levels of ammonia, an overabundance of nitrogen can develop from excess waste from the biofloc. This can also be potentially detrimental to the shrimp. In this regard, an overabundance of the solids can accumulate in the clarifier tank 62 and settle towards the bottom 63 of the clarifier tank 62. The clarifier tank 62 includes a solids removal manifold 80 to remove this excess of solids, the solids removal manifold 80 being disposed at the bottom 63 of the clarifier tank 62. The solids removal manifold 80 includes a plurality of spaced, elongate solids removal pipes 82 with a plurality of openings 83 arranged in a row on top of each solids removal pipe 82, for example. The distal end of each solids removal pipe 82 is desirably closed so as to limit the egress of the waste solids through the openings 83. The opposite ends of the solids removal pipes 82 are in fluid communication with a common pipe 84. An outlet pipe 86 extends from the common pipe 84 through one of the sidewalls 66 to a drain to remove the solid waste material flowing through the solids removal manifold 80. A shutoff valve 87 can be coupled to the outlet pipe 86 to selectively operate draining of the solid waste material.

In use, the solids removal manifold 80 is selectively operated when an excessive accumulation of the solids exists in the clarifier tank 62. If the solids removal manifold 80 is used relatively continuously, this can potentially lead to an imbalance in the desired carbon to nitrogen ratio being maintained in the clarifier tank 62.

While selective operation of the solids removal manifold 80 removes potentially harmful levels of nitrogen, selective introduction of feed also assists in maintaining the desired carbon to nitrogen ratio in the water by producing more carbon. In this regard, the feed can be a source of sucrose and the like, which when introduced into the water, raises the carbon content as part of the waste product from the biofloc, thus substantially balancing the carbon to nitrogen ratio to the desired level. In an embodiment, the desired ratio to be maintained in the water is 20:1 carbon to nitrogen for the particular biofloc, and the sucrose to promote bacterial growth is sugar. By the above described processes, the water in the clarifier tank 62 becomes clarified by removing a relatively significant amount of the waste received from the culture tank 20.

The clarified water in the clarifier tank 62 is pumped back into the culture tank 20 by a skimmer assembly 90 mounted inside the clarifier tank 62. The skimmer assembly 90 includes an elongate skimmer tube 92 desirably formed at or near a corner adjacent the common sidewall 24 between the culture tank 20 and the clarifier tank 62. In other embodiments, the wall along which the elongate skimmer tube 92 can be formed can also be a sidewall 66 of the clarifier tank 62, for example. The skimmer tube 92 extends from the bottom of the clarifier tank 62 to a certain or a selected level below the water line in the clarifier tank 62. This level is desirably about four inches below the water line. The skimmer tube 92 forms a separate compartment where the top layer of the water, the clarified water, accumulates within the skimmer tube 92 via the difference between the normal operating water level in the clarifier tank 62 and the top of the skimmer tube 92.

An air uplift assembly 100 inside the skimmer assembly 90 pumps the clarified water back into the culture tank 20. The air uplift assembly 100 includes an inlet pipe 102 having a substantially vertical section 102a extending from the bottom of the skimmer tube 92 and a horizontal section 102b extending substantially perpendicularly from the top end of the vertical section 102a. An air tube 104 extends from the air manifold 30 towards the bottom of the vertical section 102a. The supplied air from the air tube 104 creates pressure and bubbles inside the inlet pipe 102 that aerates the clarified water, draws the clarified water through the inlet pipe 102 and raises the clarified water to force the clarified water out of the inlet pipe 102 and into the culture tank 20.

The shrimp culturing system 10 can include another space saving measure in the form of an auxiliary post-larval (PL) tank 110 stackable on top of the clarifier tank 62. The PL tank 110 is desirably constructed as a smaller tank large enough to hold at least one PL shrimp cube 140 in substantially the same manner as the shrimp cubes 40 in the culture tank 20. In that regard, the PL shrimp cube 140 includes a plurality of frames 142 stacked on top of each other at spaced intervals with each frame 142 supporting a mesh 144 therein. The frames 142 are interconnected by a plurality of ropes, strings or cables 145, and the ropes, strings or cables 145 are coupled to support bars 148, which suspend the PL shrimp cubes 140 inside the PL tank 110. Also, use of the word "cube" in relation to the PL shrimp cubes 140 is not to be construed as being limited to a geometric cube shaped structure or structures or cells, similar to the shrimp cubes 40, as described.

The PL tank 110 is used as an acclimation tank to acclimate newborn or PL shrimp to the salinity of the culture tank 20 over a predetermined period of time. With respect to saltwater shrimp, the shrimp are relatively hardy creatures that can survive in a wide range of salt content. In an embodiment, the salinity that the PL shrimp experience can range from about 10-12 part salt/1000 part water to about 35 part salt/1000 part water and vice versa. The PL shrimp desirably stay in the PL tank 110 for about a month to acclimate to the salinity of the water in the culture tank 20. Though not shown for clarity, the PL tank 110 is also provided with an air diffuser assembly substantially the same as the air diffuser assembly 50 to provide the necessary aeration and water movement. At the end of the acclimation period, the PL tank 110 includes a drain 112 to drain the acclimated PL shrimp into the culture tank 20.

In use, the shrimp in the PL tank 110 are desirably cycled to maintain the population of the shrimp growing in the culture tank 20 so as to maintain a relatively continuous year-long harvest. The shrimp in the culture tank 20 mature for about three months before they are ready for harvest. During this time, the water from the culture tank 20 is recycled through the clarifier tank 62 so as to facilitate the biofloc process and substantially remove the potentially harmful concentrations of chemicals, such as ammonia. To maintain the desired carbon to nitrogen ratio in the clarifier tank 62, settled solids can be selectively removed by operation of the solids removal manifold 80 and/or introducing sugar and similar suitable compounds to promote bacterial growth, for example. The clarified water drains from the clarifier tank 62 into the skimmer tube 92, which in turn, is airlifted through the inlet pipe 102 back into the culture tank 20, as described.

In view of the foregoing, it can be seen that the shrimp culturing system 10 provides a sheltered protective environment in which a relatively maximal cultivation of shrimp can be realized. The shrimp culturing system 10 protects the shrimp from natural outside dangers, since the system is typically disposed in a covered and controlled environment. The shrimp cubes 40, 140 provide a relatively maximal habitable surface area for the shrimp to thrive, and the stackable nature of the stackable PL tank 110 on top of the clarifier tank 62 insures that the shrimp culturing system 10 occupies a relatively minimal space. The biological processes in the clarifier tank 62 can reduce economic burdens by reducing the actual feed required in the raising of the shrimp, since the shrimp can feed on the wastes from the biofloc, and relatively minimal maintenance is required to maintain the proper carbon to nitrogen ratio in the water. Moreover, the air manifold 30 provides aeration to oxygenate the tanks, induce water currents/flows to maintain solids in suspension, and motive force to transfer water from one location to another in the shrimp culturing system 10.

It is to be understood that the present invention is not limited to the embodiments described above, but encompasses any and all embodiments within the scope of the following claims.

I claim:

1. A shrimp culturing system, comprising:
   an elongated culture tank for housing shrimp being grown, the culture tank adapted to contain water and waste from the shrimp;
   a clarifier tank associated with the culture tank;
   a clarifier assembly associated with the culture tank, the clarifier assembly for assimilating the waste from the culture tank to produce clarified water, the clarifier assembly having an air uplift assembly to transfer clarified water back into the culture tank and a solids removal manifold for draining excess solids;
   the air uplift assembly includes:
      an elongate skimmer tube disposed near the corner of the clarifier tank, the skimmer tube extending from the bottom of the clarifier tank to a height adapted to be below the water line;
      at least one inlet pipe extending from the bottom of the skimmer tube and through the clarifier tank into the culture tank, the at least one inlet pipe adapted to transfer the clarified water from the skimmer tube back into the culture tank; and
      at least one air tube extending from the air manifold to a bottom of the at least one inlet pipe, the air adapted to be introduced by the air tube creating pressure and bubbles inside the inlet pipe to aerate the clarified water, draw the clarified water through the inlet pipe, and raise the clarified water to force the clarified water out into the culture tank;
   a water return line coupled to the culture tank and the clarifier assembly to facilitate transfer of water and wastes from the culture tank to the clarifier assembly;
   the water return line being coupled to a bottom of the clarifier tank to introduce the water and wastes from the culture tank;
   an air manifold disposed above at least the culture tank, the air manifold having an inlet adapted to be coupled to a source of compressed air, and a plurality of air pipes supplying air to the shrimp culturing system;
   at least one shrimp cube adapted to be suspended in at least the culture tank, each shrimp cube having a plurality of spaced layers each providing a habitable surface area for growing shrimp; and
   at least one air diffuser assembly extending below the at least one shrimp cube to aerate the at least one shrimp cube and maintain suspension of solids in the culture tank, the at least one air diffuser assembly comprising a plurality of air tubes extending at least into the culture tank to aerate and lift the water contained in at least the culture tank to oxygenate the water, induce opposing current flows in the water, and facilitate transfer of water in the shrimp culturing system.

2. The shrimp culturing system according to claim 1, wherein the air uplift assembly is disposed near a corner of the clarifier tank to skim clarified water near a water line of the clarifier tank and transfer the clarified water to the culture tank, and
   the solids removal manifold is disposed at the bottom of the clarifier tank to draw settled solids from the clarifier tank, the clarifier tank adapted to have biofloc in the water in the clarifier tank for assimilating the waste from the culture tank.

3. The shrimp culturing system according to claim 2, wherein the solids removal manifold comprises:
   a plurality of spaced, elongate solids removal pipes, each solids removal pipe having a plurality of openings thereon, the openings adapted to facilitate drawing of settled solids through the solids removal manifold;

a common pipe in fluid communication with the plurality of solids removal pipes; and an outlet pipe extending from the common pipe through one sidewall of the clarifier tank to drain and remove the drawn solids flowing through the common pipe.

4. The shrimp culturing system according to claim 3, wherein the solids removal manifold further comprises a shutoff valve coupled to the outlet pipe to selectively operate draining of the solids.

5. The shrimp culturing system according to claim 2, further comprising:

a post-larval (PL) tank adapted to be selectively mounted atop the clarifier tank, the PL tank adapted to facilitate acclimation of PL shrimp to water salinity of the culture tank.

6. The shrimp culturing system according to claim 5, wherein the PL tank comprises:

at least one PL shrimp cube selectively suspended inside the PL tank, the at least one PL shrimp cube providing a habitable surface area for PL shrimp to thrive; and an outlet to facilitate selective draining of the PL shrimp into the culture tank.

7. The shrimp culturing system according to claim 1, wherein the water return line further comprises a control valve operatively coupled to the water return line to facilitate selective flow of the water and wastes.

8. The shrimp culturing system according to claim 1, wherein the at least one shrimp cube comprises:

a plurality of frames, each frame having a mesh mounted therein, each frame being stackable with each other, each frame having a plurality of openings at select locations;

a plurality of connecting members, each connecting member threaded through a select one of the plurality of openings on each frame and secured thereon, the connecting members facilitating hanging of the plurality of frames at predetermined spaced intervals; and at least a pair of support bars, the plurality of connecting members being coupled to the support bars to be suspended therefrom, the support bars being selectively placed on top of the air manifold above the culture tank to support the suspension of at least one shrimp cube in the culture tank.

9. The shrimp culturing system according to claim 8, wherein the at least one air diffuser assembly comprises:

the plurality of air tubes extending into the culture tank below the at least one shrimp cube; and a diffuser coupled to each of the air tubes, the diffuser to aerate and move the water contained in the culture tank and provide oxygen for the shrimp residing in the at least one shrimp cube, the aeration propagating through the frames to agitate the water and maintain suspension of solids in the water.

10. A shrimp culturing system, comprising:

an elongated culture tank for housing shrimp being grown, the culture tank adapted to contain water and waste from the shrimp;

a clarifier assembly integrally coupled to the culture tank, the clarifier assembly adapted to assimilate the waste from the culture tank to produce clarified water, the clarifier assembly having an air uplift assembly to transfer clarified water back into the culture tank and a solids removal manifold for draining excess solids;

a water return line coupled to the culture tank and the clarifier assembly to facilitate transfer of water and wastes from the culture tank to the clarifier assembly;

an air manifold disposed above at least the culture tank, the air manifold adapted to provide air to the shrimp culturing system to aerate the water, induce opposing current flows in the water, and facilitate transfer of water in the shrimp culturing system;

a plurality of shrimp cubes adapted to be suspended in at least the culture tank, each shrimp cube having a plurality of spaced layers each providing a habitable surface area for growing shrimp; and a plurality of air diffuser assemblies extending below the shrimp cubes to aerate the shrimp cubes and maintain suspension of solids in the culture tank;

wherein the clarifier assembly includes a clarifier tank associated with the culture tank; and wherein the air uplift assembly includes:

an elongate skimmer tube disposed near the corner of the clarifier tank, the skimmer tube extending from the bottom of the clarifier tank to a height adapted to be below the water line;

at least one inlet pipe extending from the bottom of the skimmer tube and through the clarifier tank into the culture tank, the at least one inlet pipe adapted to transfer the clarified water from the skimmer tube back into the culture tank; and at least one air tube extending from the air manifold to a bottom of the at least one inlet pipe, the air adapted to be introduced by the air tube creating pressure and bubbles inside the inlet pipe to aerate the clarified water, draw the clarified water through the inlet pipe, and raise the clarified water to force the clarified water out into the culture tank.

11. The shrimp culturing system according to claim 10, wherein the clarifier assembly comprises:

a clarifier tank integrally attached to the culture tank, the clarifier tank adapted to have biofloc to assimilate the wastes from the culture tank to produce clarified water, wherein the water return line is coupled to a bottom of the clarifier tank to introduce the water and wastes from the culture tank, and the solids removal manifold is disposed at the bottom of the clarifier tank to draw settled solids from the clarifier tank.

12. The shrimp culturing system according to claim 11, further comprising:

a post-larval (PL) tank adapted to be selectively mounted atop the clarifier tank, the PL tank adapted to facilitate acclimation of PL shrimp to water salinity of the culture tank.

13. The shrimp culturing system according to claim 12, wherein the PL tank comprises:

at least one PL shrimp cube adapted to be selectively suspended inside the PL tank, the at least one PL shrimp cube providing a habitable surface area for PL shrimp to thrive; and an outlet to facilitate selective draining of the PL shrimp into the culture tank.

14. The shrimp culturing system according to claim 10, wherein the plurality of shrimp cubes each comprises:

a plurality of frames, each frame having a mesh mounted therein, each frame being stackable with each other, each frame having a plurality of openings at select locations;

a plurality of connecting members, each connecting member being threaded through a select one of the plurality of openings on each frame and secured thereon, the connecting members facilitating hanging of the plurality of frames at predetermined spaced intervals; and at least a pair of support bars, the plurality of connecting members being coupled to the support bars to be suspended therefrom, the support bars being selectively placed on top of the air manifold above the culture tank to support the suspension of the shrimp cubes in the culture tank.

15. The shrimp culturing system according to claim 14, wherein the plurality of air diffuser assemblies each comprises:

at least one air tube extending into the culture tank below the shrimp cubes; and a diffuser coupled to the at least one air tube, the diffuser to aerate and move the water contained in the culture tank and provide oxygen for the shrimp residing in the shrimp cubes, the aeration propagating through the frames to agitate the water and maintain suspension of solids in the water.

* * * * *